US012567235B2

(12) United States Patent (10) Patent No.: US 12,567,235 B2
Sibille (45) Date of Patent: Mar. 3, 2026

(54) VISUAL EXPLANATION OF CLASSIFICATION

(71) Applicant: Siemens Medical Solutions USA, Inc., Malvern, PA (US)

(72) Inventor: Ludovic Sibille, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 393 days.

(21) Appl. No.: 18/246,338

(22) PCT Filed: Jan. 18, 2021

(86) PCT No.: PCT/US2021/070050

§ 371 (c)(1),
(2) Date: Mar. 23, 2023

(87) PCT Pub. No.: WO2022/154981

PCT Pub. Date: Jul. 21, 2022

(65) Prior Publication Data

US 2023/0360366 A1      Nov. 9, 2023

(51) Int. Cl.
*G06V 10/764*          (2022.01)
*G06N 3/0475*          (2023.01)
(Continued)

(52) U.S. Cl.
CPC .......... *G06V 10/764* (2022.01); *G06T 7/0012* (2013.01); *G06V 10/762* (2022.01);
(Continued)

(58) Field of Classification Search
CPC ............ G06F 18/214; G06F 18/24133; G06N 3/0475; G06T 2207/10116;
(Continued)

(56) References Cited

U.S. PATENT DOCUMENTS 3,605,285 A * 9/1971 Bendaniel et al. .... G09B 5/062
                                                            434/318
4,120,049 A * 10/1978 Thaler ................. G06F 12/0207
                                                            711/E12.003
(Continued)

FOREIGN PATENT DOCUMENTS

CN          107909621          4/2018
CN          107997778          5/2018
(Continued)

OTHER PUBLICATIONS

International Search Report for Corresponding PCT Appln No. PCT/US2021/070050, mailed Oct. 5, 2021.
(Continued)

*Primary Examiner* — Tsung Yin Tsai

(57)          ABSTRACT

A framework for visual explanation of classification. The framework trains (204) a generative model to generate new images that resemble input images but are classified by the classifier as belonging to one or more alternate classes. At least one explanation mask may then be generated (206) by performing optimization based on a current input image and a new image generated by the trained generative model from the current input image.

18 Claims, 9 Drawing Sheets

300

(51) Int. Cl.
| | |
|---|---|
| *G06T 7/00* | (2017.01) |
| *G06V 10/762* | (2022.01) |
| *G06V 10/774* | (2022.01) |

(52) U.S. Cl.
CPC ......... *G06V 10/774* (2022.01); *G06N 3/0475* (2023.01); *G06T 2207/10116* (2013.01); *G06T 2207/20081* (2013.01); *G06T 2207/20084* (2013.01)

(58) Field of Classification Search
CPC . G06T 2207/20081; G06T 2207/20084; G06T 7/0012; G06V 10/762; G06V 10/764; G06V 10/774
See application file for complete search history.

(56) References Cited

U.S. PATENT DOCUMENTS

| | | | | |
|---|---|---|---|---|
| 11,620,748 | B2 * | 4/2023 | Ratner | G06T 7/0012 |
| | | | | 382/128 |
| 2016/0063720 | A1 | 3/2016 | Han et al. | |
| 2018/0260957 | A1 | 9/2018 | Dong et al. | |
| 2019/0180136 | A1 | 6/2019 | Bousmalis et al. | |
| 2020/0043171 | A1 | 2/2020 | Laradji et al. | |
| 2021/0125061 | A1 * | 4/2021 | Munoz Delgado | |
| | | | | G06F 16/90335 |
| 2021/0248423 | A1 * | 8/2021 | Munoz Delgado | |
| | | | | G06F 18/2413 |
| 2021/0326661 | A1 * | 10/2021 | Munoz Delgado | G06N 3/047 |
| 2022/0172050 | A1 * | 6/2022 | Dalli | G06N 3/0495 |
| 2022/0188645 | A1 * | 6/2022 | Nia | G06N 3/084 |
| 2022/0222811 | A1 * | 7/2022 | Ratner | G06V 10/764 |
| 2023/0325640 | A1 * | 10/2023 | Thewes | G06N 3/0455 |
| | | | | 706/21 |
| 2024/0371015 | A1 * | 11/2024 | Ansari | G06N 3/0464 |

FOREIGN PATENT DOCUMENTS

| | | |
|---|---|---|
| CN | 112001488 | 11/2020 |
| EP | 3739515 | 11/2020 |
| JP | 2019197311 | 11/2019 |
| JP | 2020187753 | 11/2020 |
| RU | 2735148 | 10/2020 |

OTHER PUBLICATIONS

Kingma, Diederik P., and Jimmy Ba. "Adam: A method for stochastic optimization." arXiv preprint arXiv:1412.6980 (2014).

Fagan, Lawrence M., Edward H. Shortliffe, and Bruce G. Buchanan. "Computer-based medical decision making: from MYCIN to VM." Automedica 3.2 (1980): 97-108.

Isola, Phillip, et al. "Image-to-image translation with conditional adversarial networks." Proceedings of the IEEE conference on computer vision and pattern recognition. 2017.

LeCun, Yann. "A learning scheme for asymmetric threshold networks." Proceedings of COGNITIVA 85.537 (1985): 599-604.

Li, Kunpeng, et al. "Tell me where to look: Guided attention inference network." Proceedings of the IEEE conference on computer vision and pattern recognition. 2018.

Naitzat, Gregory, Andrey Zhitnikov, and Lek-Heng Lim. "Topology of deep neural networks." The Journal of Machine Learning Research 21.1 (2020): 7503-7542.

Selvaraju, Ramprasaath R., et al. "Grad-cam: Visual explanations from deep networks via gradient-based localization." Proceedings of the IEEE international conference on computer vision. 2017.

Springenberg, Jost Tobias, et al. "Striving for simplicity: The all convolutional net." arXiv preprint arXiv:1412.6806 (2014).

Sundararajan, Mukund, Ankur Taly, and Qiqi Yan. "Axiomatic attribution for deep networks." International conference on machine learning. PMLR, 2017.

* cited by examiner

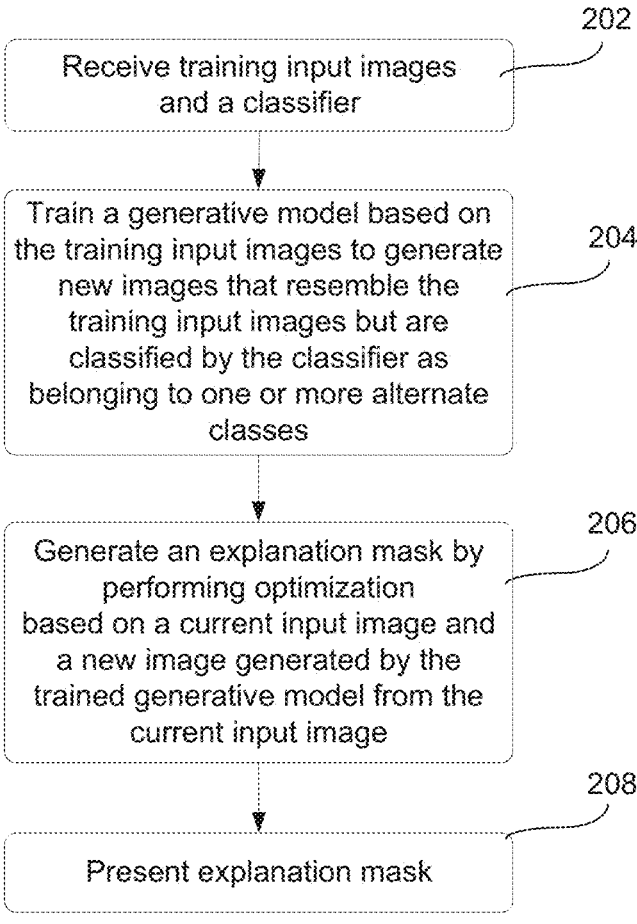

202

Receive training input images and a classifier

204

Train a generative model based on the training input images to generate new images that resemble the training input images but are classified by the classifier as belonging to one or more alternate classes

206

Generate an explanation mask by performing optimization based on a current input image and a new image generated by the trained generative model from the current input image

208

Present explanation mask

Image    Grad-CAM    Backprop    Guided Backpro    Integrated Gradient    Proposed 602    604    606    608    610    612

Image    Grad-CAM    Backprop    Guided Backprop    Integrated Gradient    Proposed

VISUAL EXPLANATION OF CLASSIFICATION

TECHNICAL FIELD

The present disclosure generally relates to digital medical data processing, and more particularly to visual explanation of classification.

BACKGROUND

In recent years, artificial intelligence (AI) systems have seen tremendous progress in terms of accuracy on a wide range of tasks and domains. However, these systems have essentially been black boxes, trading accuracy improvement by a decrease in transparency: these algorithms cannot explain their decision. The lack of transparency is problematic, particularly in the medical domain, where humans must be able to understand how a decision was made in order to trust an AI system. More transparency will enable human operators to know when an AI decision can be trusted and when it should be discarded.

Explainable AI (referred to as XAI in the literature) is an emergent field and many techniques have been published on the topic. The purpose of XAI is to provide important factors that lead to a classification. These methods may be grouped in the following categories: (1) symbolic; (2) saliency-based; and (3) attention-based.

Symbolic reasoning systems were developed in the 70s-90s with built-in explanation capabilities. However, these systems do not work well on non-categorical tasks, such as interpretation of an image. Saliency-based methods require the classifier to have its output differentiable relative to its input. Numerous methods, such as guided backpropagation, Grad-CAM, integrated gradient and others were proposed in the literature. See, for example, Springenberg, Jost Tobias et al. "Striving for Simplicity: The All Convolutional Net." *CoRR* abs/1412.6806 (2015); Selvaraju, R. R., Cogswell, M., Das, A. et al. Grad-CAM: Visual Explanations from Deep Networks via Gradient-Based Localization. Int J Comput Vis 128, 336-359 (2020); and Sundararajan, M., Taly, A., and Yan, Q., "Axiomatic Attribution for Deep Networks", 2017 respectively, which are herein incorporated by reference. Saliency-based methods look mainly at the influence of the input by calculating the derivative of the input relative to the output of the neural network (NN). Well-trained neural networks project their input to a low dimensional manifold, which is then classified. However, because of the noise inherently present in the image, the NN may not project the input exactly on the manifold. The derivative of the input relative to the output will exacerbate the noise and result in noisy patterns in the saliency map that are difficult to interpret. This effect is amplified in medical imaging applications, which typically have low number training samples and a relative similarity of the samples (i.e., it is easier to fall outside the manifold).

Attention-based methods use a trainable attention mechanism that is added to a neural network to help localize relevant locations in an image. See, for example, K. Li, Z. Wu, K. Peng, J. Ernst and Y. Fu, "Tell Me Where to Look: Guided Attention Inference Network," 2018 *IEEE/CVF Conference on Computer Vision and Pattern Recognition*, Salt Lake City, U T, 2018, pp. 9215-9223, which is herein incorporated by reference. Attention-based methods do not "explain" classification but point to relevant regions that need further interpretation. Therefore, they are not so suitable for medical applications.

SUMMARY

Described herein is a framework for visual explanation of classification. In accordance with one aspect, the framework trains a generative model to generate new images that resemble input images but are classified by the classifier as belonging to one or more alternate classes. At least one explanation mask may then be generated by performing optimization based on a current input image and a new image generated by the trained generative model from the current input image.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

FIG. 2 shows an exemplary method of generating an explanation mask;

DETAILED DESCRIPTION

Figure 1:
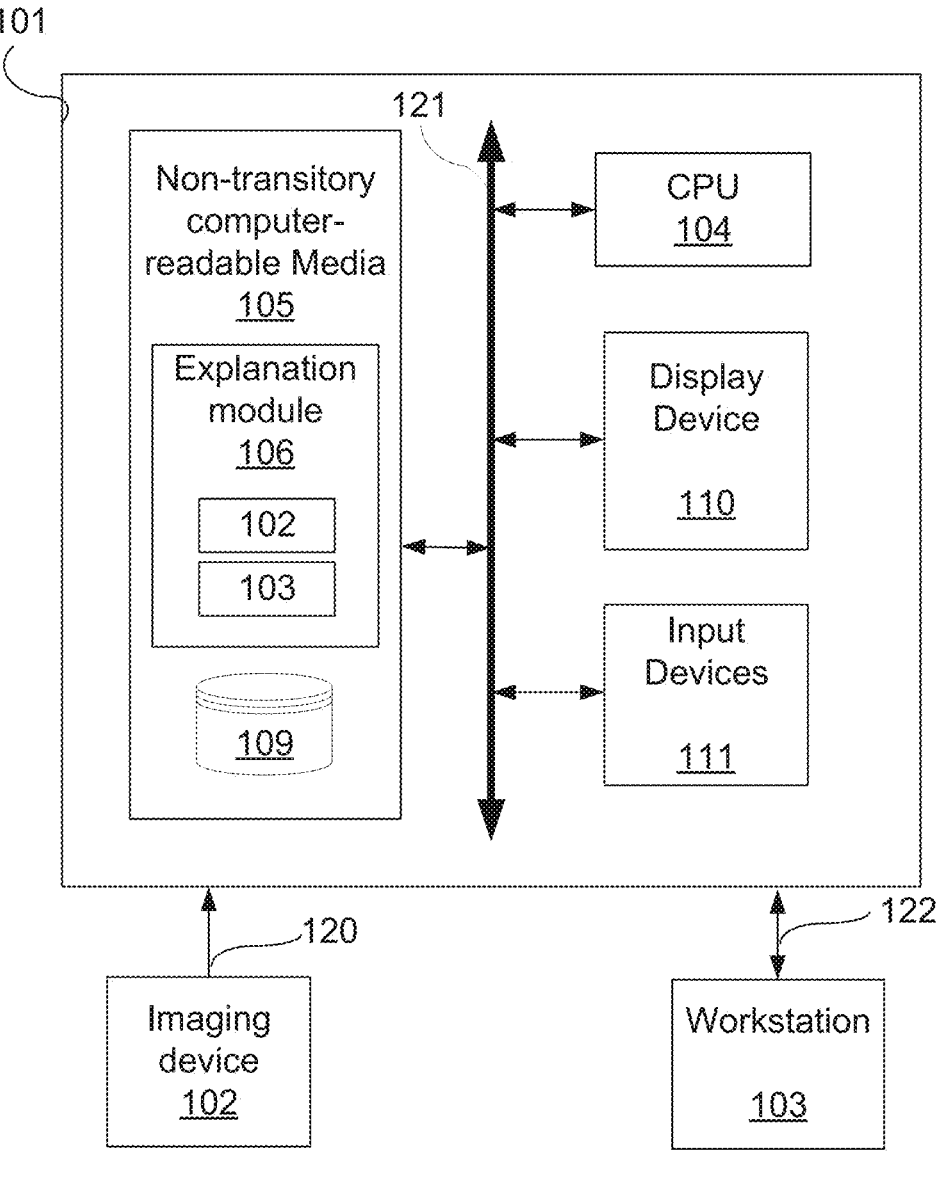
FIG. 1 shows an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed; on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MM, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one skilled in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displayed as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the terms "new input image", "fake image", "output image" and "new image" may be used interchangeably.

One aspect of the present framework provides an explanation of abnormalities detected by any classifier tasked with normal versus abnormal decisions by training a generative model. The generative model may be trained to produce new images that resemble the input images but are classified by the classifier as belonging to one or more alternate classes. The generative model constrains the explanation to remove noise from the explanation mask (or map). The level of noise in the generated explanation mask is advantageously magnitudes lower than in existing methods, thereby making the interpretation of the explanation mask straightforward. The trained generative model may produce a new input image x' that can be used to understand what the classifier considers as the class with the highest probability. This is very useful for understanding the biases of the classifier (e.g., would an expert reader looking at x' make the same classification?) or from the designer's perspective, it can be ensured that the classifier was trained adequately and mimics what experts know of the disease. These and other features and advantages will be described in more details herein.

FIG. 1 is a block diagram illustrating an exemplary system 100. The system 100 includes a computer system 101 for implementing the framework as described herein. In some implementations, computer system 101 operates as a standalone device. In other implementations, computer system 101 may be connected (e.g., using a network) to other machines, such as imaging device 102 and workstation 103. In a networked deployment, computer system 101 may operate in the capacity of a server (e.g., thin-client server), a cloud computing platform, a client user machine in server-client user network environment, or as a peer machine in a peer-to-peer (or distributed) network environment.

In some implementations, computer system 101 comprises a processor or central processing unit (CPU) 104 coupled to one or more non-transitory computer-readable media 105 (e.g., computer storage or memory), display device 110 (e.g., monitor) and various input devices 111 (e.g., mouse or keyboard) via an input-output interface 121. Computer system 101 may further include support circuits such as a cache, a power supply, clock circuits and a communication bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in non-transitory computer-readable media 105. In particular, the present techniques may be implemented by an explanation module 106 and a database 109. The explanation module 106 may include a training unit 102 and an optimizer 103.

Non-transitory computer-readable media 105 may include random access memory (RAM), read-only memory (ROM), magnetic floppy disk, flash memory, and other types of memories, or a combination thereof. The computer-readable program code is executed by CPU 104 to process medical data retrieved from, for example, imaging device 102. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing a database (or dataset) 109 (e.g., medical images). Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a cloud platform or system, a picture archiving and communication system (PACS), or any other hospital, medical institution, medical office, testing facility, pharmacy or other medical patient record storage system.

Imaging device 102 acquires medical image data 120 associated with at least one patient. Such medical image data 120 may be processed and stored in database 109. Imaging device 102 may be a radiology scanner (e.g., X-ray, MR or a CT scanner) and/or appropriate peripherals (e.g., keyboard and display device) for acquiring, collecting and/or storing such medical image data 120.

The workstation 103 may include a computer and appropriate peripherals, such as a keyboard and display device, and can be operated in conjunction with the entire system 100. For example, the workstation 103 may communicate directly or indirectly with the imaging device 102 so that the medical image data acquired by the imaging device 102 can be rendered at the workstation 103 and viewed on a display device. The workstation 103 may also provide other types of medical data 122 of a given patient. The workstation 103 may include a graphical user interface to receive user input via an input device (e.g., keyboard, mouse, touch screen voice or video recognition interface, etc.) to input medical data 122.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

FIG. 2 shows an exemplary method 200 of generating an explanation mask. It should be understood that the steps of the method 200 may be performed in the order shown or a different order. Additional, different, or fewer steps may also be provided. Further, the method 200 may be implemented with the system 101 of FIG. 1, a different system, or a combination thereof.

At 202, training unit 102 receives training input images and a classifier $f$. The training input images may be medical images acquired, directly or indirectly, by using medical imaging techniques such as high-resolution computed tomography (HRCT), magnetic resonance (MR) imaging, computed tomography (CT), helical CT, X-ray, angiography, positron emission tomography (PET), fluoroscopy, ultrasound, single photon emission computed tomography (SPECT), or a combination thereof. The training input images may include normal and abnormal images for evaluating one or more kinds of diseases. For example, the training input images may include normal and abnormal Dopamine Transporter Scan (DaTscan) SPECT images for evaluating Parkinson's disease. As another example, the training input images may include amyloid positive and amyloid negative PET images for evaluating amyloidosis. An abnormal image contains at least one abnormality (e.g., abnormal accumulation of alpha-synuclein protein in brain cells, amyloid deposits, lesions), whereas a normal image does not contain any abnormalities.

In some implementations, the classifier $f$ is a binary classifier that is trained to classify the training input images as normal or abnormal images. It should be appreciated that the classifier $f$ may also be a non-binary classifier in other implementations. The classifier $f$ may take as input x and return an output O representing classification probabilities among N classes, wherein c is the class with the highest probability. The classifier $f$ may be implemented using machine learning techniques, including but not limited to, neural network, decision tree, random forest, and support vector machine, coevolutionary neural networks or a combination thereof.

At 204, training unit 102 trains a generative model with the training input images to generate new high quality fake images x. The generative model is trained to generate new input images x' that resemble (or are as close as possible) to the training input images x but are classified by the classifier as belonging to one or more alternate classes (i.e., one or more different classes from the respective training input images). The generative model is a class of statistical models that can generate new data instances. The generative model includes the distribution of the data itself, and indicates how likely a given example is. In some implementations, the generative model is a conditional generative model, where the input image x is conditioned on to generate a corresponding output image x'. The generative model may be, for example, a deep generative model that is formed through the combination of generative models and deep neural networks. Examples of deep generative models include, but are not limited to, Variational Autoencoder (VAE), Generative Adversarial Networks (GANs) and auto-regressive models.

In one implementation, the generative model includes a Generative Adversarial Network (GAN). A generative adversarial network (GAN) is a machine learning framework that includes two neural networks—generator G and discriminator D—that contest with each other in a minimax game. The generative model may also be a conditional GAN. A conditional GAN (cGAN) learns a conditional generative model of data, wherein the input image x is conditioned on to generate a corresponding output image x' that is used as input to the discriminator for training. See, e.g., Isola, Phillip et al., "Image-to-Image Translation with Conditional Adversarial Networks," 2017 IEEE Conference on Computer Vision and Pattern Recognition (CVPR) (2017): 5967-5976, which is herein incorporated by reference. The goal of the generator G is to generate a fake input x' that is indistinguishable from the real input x. The purpose of the discriminator D is to recognize the real inputs from the fake inputs generated by G. The generator G and discriminator D are optimized in turn and the minimax game ideally converges to a generator G producing high quality new input images x' that mimic the distribution of x while the discriminator D is not able to guess if the new input image x' was real or fake. Unlike an unconditional GAN, both G and D in the cGAN observe the input image x.

Figure 3:
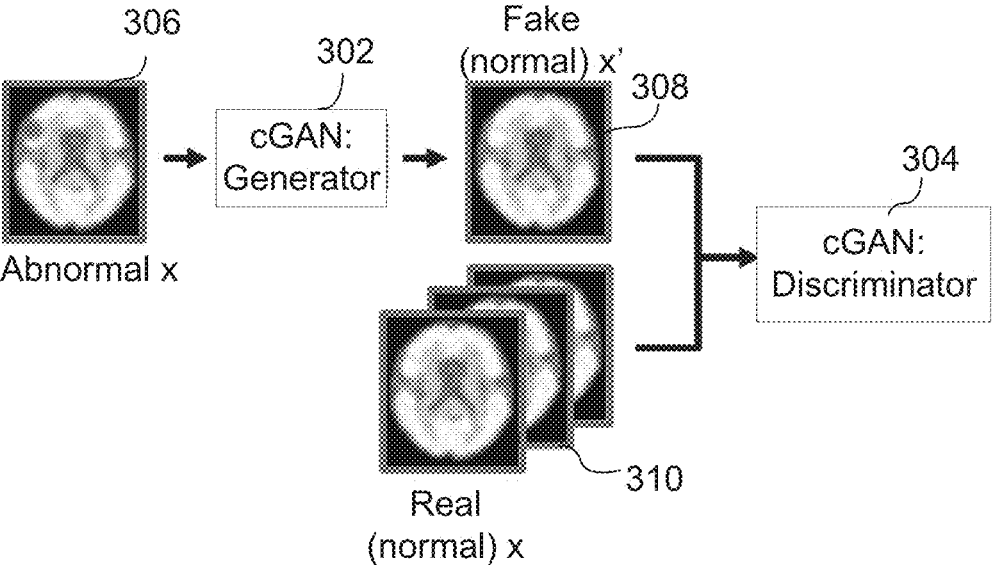
FIG. 3 illustrates an exemplary cGAN architecture.

FIG. 3 illustrates an exemplary cGAN architecture 300. The cGAN includes a generator 302 and a discriminator 304. The generator 302 may be trained to take as input image x (306) and generate a new input image x' (308) with the constraints to be as close as possible to input image x (306) but classified in an alternate class by the classifier ƒ For example, if the input image x (306) is classified by the classifier as "abnormal", the generator 302 may be trained to generate the new image x' (308) to be a "normal" image and closely resembling the input image x (306). As another example, if the input image x (306) is classified by the classifier as "normal", the generator 302 may be trained to generate the new image x' (308) to be an "abnormal" image closely resembling the input image x (306). The discriminator 304 may be trained to recognize the real input images (310) from the fake input images x' (308) generated by the generator 302.

The cGAN Objective May be Formulated as Below:

$$G^*=\arg\min_G\max_D\mathrm{Loss}_{cGAN}(G,D) \qquad (1)$$

$$\text{with } \mathrm{Loss}_{cGAN}(G,D)=E_{x,c}[\log D(x,c)]+E_{x,c}[\log(1-D(G(x,c),c)] \qquad (2)$$

wherein x is the observed input image, c is the class with the highest probability, G(x, c) is the new image x' of G, D(x, c) is the output of D and $\mathrm{Loss}_{cGAN}$(G, D) is a loss function for G and D. G tries to minimize the loss function $\mathrm{Loss}_{cGAN}$(G, D) against an adversarial D that tries to maximize it. The loss function $\mathrm{Loss}_{cGAN}$(G, D) is a sum of expected values $E_{x,c}$ [log D(x, c)] and $E_{x,c}$[log (1−D(G (x, c), c)], with x and c sampled from the possible images and classes respectively. In Other Implementations, the cGAN Objective is Formulated as Below:

$$G^*=\arg\min_G\max_D\mathrm{Loss}_{cGAN}(G,D)+\alpha L1(G) \qquad (3)$$

$$\text{with } \mathrm{Loss}_{cGAN}(G,D)=E_{x,c}[\log D(x,c)]+E_{x,c}[\log(1-D(G(x,c),c)] \qquad (4)$$

$$\text{and } L1(G)=\|x-G(x,c)\|_1 \qquad (5)$$

wherein x is the observed input image, c is the class with the highest probability, G (x, c) is the new image x' of G, D(x, c) is the output of D, $\mathrm{Loss}_{cGAN}$(G, D) is a loss function for G and D, a is a parameter and L1(G) is the distance between the observed input image x and the new image x' generated by G (i.e., x'=G(x, c)). In this case, D's job remains unchanged, but G is trained to not only fool D but also to be near the ground truth output in the L1 sense. In other words, G is penalized if it generates new images x' that are dissimilar to (or do not resemble) the input image x.

In Yet Other Implementations, the cGAN Objective is Formulated as Below:

$$G^*=\arg\min_G\max_D\mathrm{Loss}_{cGAN}(G,D)+\alpha L1(G)+\beta L(\mathit{f}(G)) \qquad (6)$$

$$\text{with } \mathrm{Loss}_{cGAN}(G,D)=E_{x,c}[\log D(x,c)]+E_{x,c}[\log(1-D(G(x,c),c)] \qquad (7)$$

$$\text{and } L1(G)=\|x-G(x,c)\|_1 \qquad (8)$$

wherein x is the observed input image, c is the class with the highest probability, G (x, c) is the new image x' of G, D(x, c) is the output of D, $\mathrm{Loss}_{cGAN}$(G, D) is a loss function for G and D, α and β are parameters, ƒ is a classification function (or classifier), L1(G) is the distance between the observed input x and the new image x' generated by G (i.e., x'=G(x, c)) and L is a loss term that penalizes generator G if it generates images recognized by the classifier as belonging to an incorrect class. Exemplary values of parameters α and β may be, for example, 0.0002 and (0.5, 0.999) respectively. In the objective function (6), the disease classifier is linked to the generator 302 by the loss term L, such that the generator 302 is penalized if it produces new images that are considered to belong to the incorrect class by the classifier. For example, if G tries to generate a "normal" image from an "abnormal" input image and the disease classifier classifies this generated new image as "abnormal" (instead of normal), L is assigned a non-zero value so as to penalize G. This loss term ensures that the generator G and classifier are connected.

The training of the cGAN may be implemented with various techniques, such as a conditional autoencoder, conditional variational auto encoder and/or other GAN variants. In addition, the trained cGAN may be optimized by using, for example, ADAM optimizer—an adaptive gradient descent algorithm (ADAM). See, for example, Kingma, D. P. and Ba, J. (2014), *Adam: A Method for Stochastic Optimization*, which is herein incorporated by reference. Other types of optimization algorithms may also be used.

The trained generator G may generate a new input image x' that can be used to understand what the classifier considers as class c. This is very useful for understanding the biases of the classifier (e.g., would an expert reader looking at x' make the same classification), or from the designer's perspective, it can be ensured that the classifier was trained adequately and mimics what experts know of the disease.

Returning to FIG. 2, at 206, optimizer 103 generates an explanation mask by performing optimization based on a current input image x and a new image x' generated by the trained generative model from the current input image. The current input image x may be acquired from a patient by, for example, imaging device 102, using the same modality (e.g., SPECT or PET scanner) as that used to acquire the training images. The explanation mask may then be generated by performing optimization based on the current input image x and new image x' to decrease a classification probability of the classifier to a predetermined value. The explanation mask represents the voxels that need to be changed in the current input image x to change the classifier's decision, so these voxels are a possible explanation of the classification by the classifier. Each value in the explanation mask represents a blending factor between x and x'.

Figure 4A:
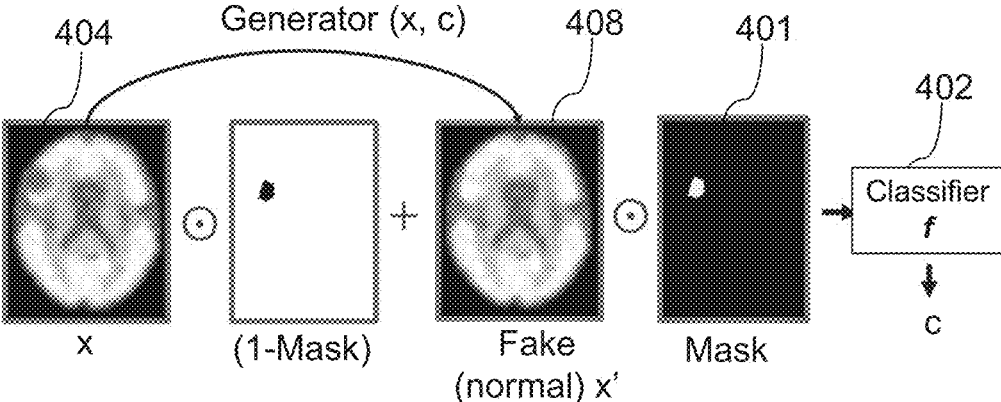
FIG. 4A shows an exemplary optimization architecture.

FIG. 4A shows an exemplary optimization architecture 400. New image x' (408) is generated by G of a trained cGAN based on the observed input image x (404) and the class c. Mask (401) represents the portion of the input image x (404) to be blended with the new input image x' (408). The classification function ƒ (402) takes as input a combination of input image x (404) and new fake image x' (408) blended by Mask (401) and returns an output O representing the classification probabilities among N classes where c is the class of highest probability. The gradient of Mask (401) relative to the classifier's output O is constrained to be a blend of x and x', while x' is by design constructed to be similar to x, thereby limiting unrealistic sources of noise and enhances robustness to noise.

The optimization tries to find the smaller Mask' that decreases the classifier probability of class c to a probability of 1/N, wherein N is the total number of classes determined by the classifier. The optimization problem may be formulated as follows:

$$\text{Mask}' = \underset{\text{Mask}}{\text{argmin}} \quad f(x'') + \alpha\|\text{Mask}\| \qquad (9)$$

$$\text{s.t. } f(x'')[c] = \frac{1}{N}$$

$$\text{wherein } x'' = x \odot (1 - \text{Mask}) + x' \odot \text{Mask} \qquad (10)$$

α (e.g., 0.05) represents a scaling factor to control the sparsity of the explanation mask (411) and $\odot$ represents the element wise multiplication of the two terms. Combined input x" represents the sum of the current input image x and the new image x' blended by the previous Mask. The optimization is performed for the combined input x" that minimizes the classifier's (402) probability of class c. Therefore, by construction, the combined input x" is in the same domain as the input x (404) and can be interpreted as such.

The optimization may be implemented using a backpropagation algorithm by calculating the partial derivative of the classifier's output O(c) relative to the Mask (401). See, e.g., Le Cun Y. (1986), "*Learning Process in an Asymmetric Threshold Network*". Disordered Systems and Biological Organization, NATO ASI Series (Series F: Computer and Systems Sciences), vol 20. Springer, Berlin, Heidelberg, which is herein incorporated by reference. The optimization is stopped once the classifier $f(x'')(c)$ reaches a predetermined probability (e.g., 1/N). It may not be desirable to reach a probability of 0, since this may introduce noise in the mask and 1/N was found to be a good compromise between noise and explanation. In some implementations, the backpropagation is applied a maximum of 200 times with a learning rate of 0.1.

Figure 4B:
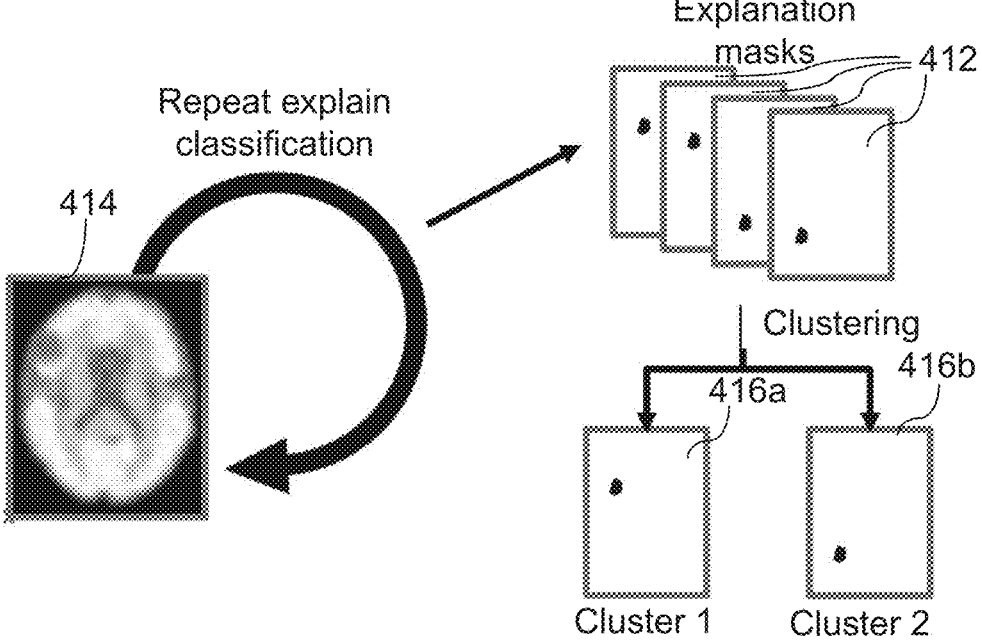
FIG. 4B illustrates an exemplary process for generating multiple explanation masks.

The present framework may be extended to support multiple modes of normality or abnormality. This can be done by sampling multiple new input images x' from the generator G and aggregating the explanation masks for each x' generated by the architecture 400. Multiple explanation masks may be generated from a single current input image x. FIG. 4B illustrates an exemplary process 410 for generating multiple explanation masks. Multiple different explanation masks 412 may be generated by passing the same single input image x (414) through the trained generative model multiple times (e.g., 100) to generate multiple new input images x which are then passed through the architecture 400 to generate multiple explanation masks 412. The multiple different explanation masks 412 may optionally be aggregated to improve robustness of the explanation. Aggregation may be performed by, for example, averaging or clustering the explanation masks.

As shown in the exemplary process 410, clustering may be performed to generate multiple clusters 416*a-b*. It should be appreciated that although only two clusters (Cluster 1 and Cluster 2) are shown, any other number of clusters may be generated. Different clusters may represent, for example, different lesions or other abnormalities. A clustering algorithm may include, for example, density-based spatial clustering of applications with noise (DBSCAN) or other suitable techniques. A representative explanation mask may be selected for each cluster (e.g., cluster center) and presented to the user. The size of the cluster may be used to order the explanation masks for the user or characterize the importance of the explanations.

Returning to FIG. 2, at 208, explanation module 106 presents the explanation mask. The explanation mask may be displayed at, for example, a graphical user interface displayed on workstation 103. The explanation mask provides a visual explanation of classification (e.g., abnormal classification) generated by the classifier. The level of the noise in the explanation mask is advantageously much lower than those produced by existing methods, thereby making interpretation of the explanation mask more straightforward. Additionally, the new input image x' produced by the trained generative model may also be displayed at the graphical user interface. The new input image x' may be used to understand what the classifier considers as the class with the highest probability.

The present framework was implemented in the context of Parkinson's disease. A classifier was trained on DaTscan images to classify them as normal versus abnormal images. The classifier was trained using 1356 images, tested on 148 images and obtained an accuracy of 97% on the test data.

Figure 5:
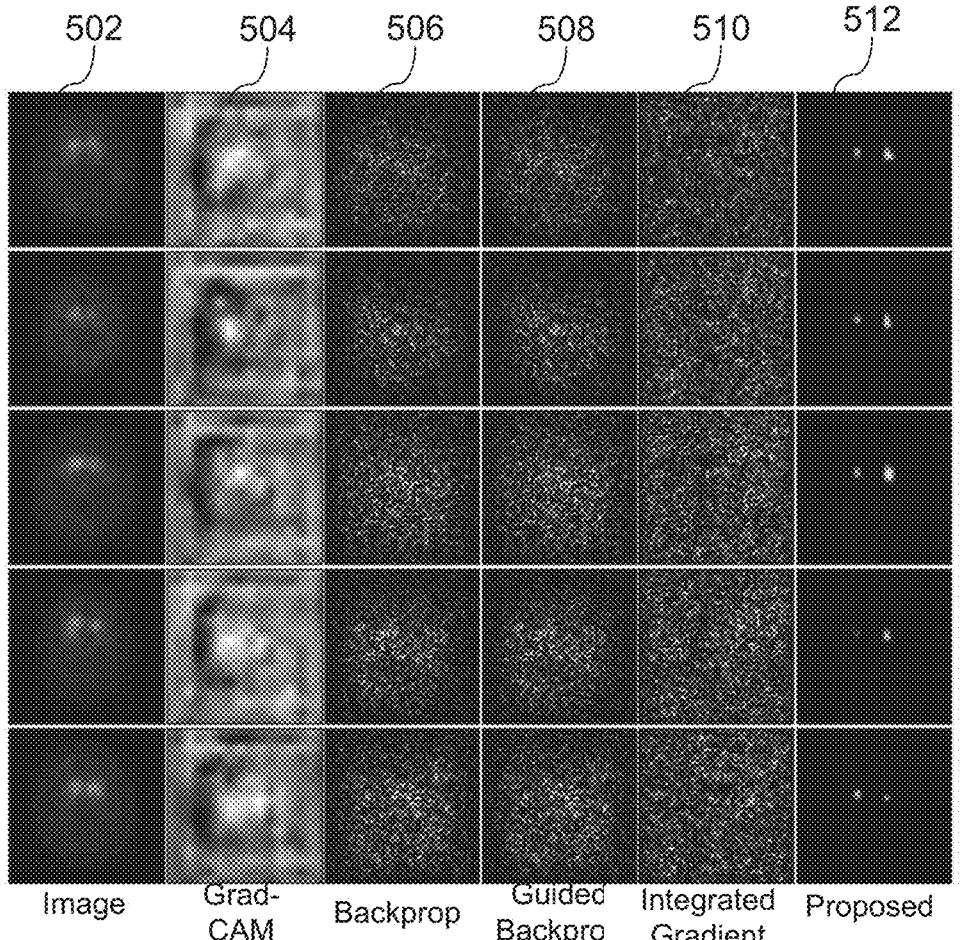
FIG. 5 illustrates an exemplary comparison of results.

FIG. 5 illustrates an exemplary comparison of results obtained by using different traditional algorithms and the present framework to explain the classification of the classifier. The traditional algorithms include Grad-CAM, backpropagation, guided backpropagation and integrated gradient algorithms. Column 502 shows randomly selected abnormal input DaTscan images. Columns 504, 506, 508 and 510 display explanation maps generated based on the input images in column 502 using standard algorithms. Column 512 displays the explanation maps generated by the present framework. The explanation maps generated by the traditional methods exhibit extreme noise that makes them difficult to interpret. In contrast, the explanation maps generated by the present framework show very low noise, thereby making interpretation straightforward.

Figure 6:
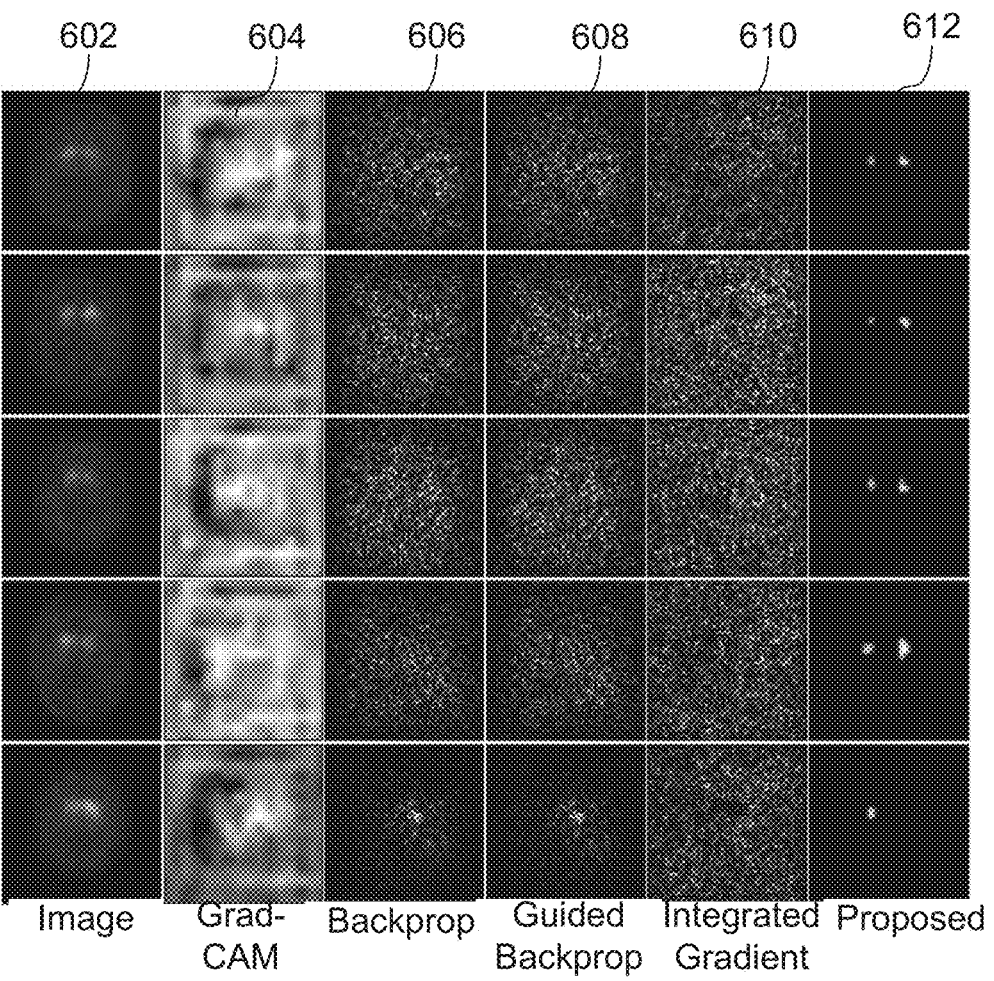
FIG. 6 illustrates another exemplary comparison of results.

FIG. 6 illustrates another exemplary comparison of results obtained by using different traditional algorithms and the present framework to explain the classification of the classifier. Columns 604, 606, 608 and 610 display explanation maps generated based on the input images in column 602 using traditional algorithms. Column 612 displays the explanation maps generated by the present framework. Compared to the present framework, the traditional methods generate explanation maps that exhibit more extreme noise, thereby making them difficult to interpret.

Figure 7:
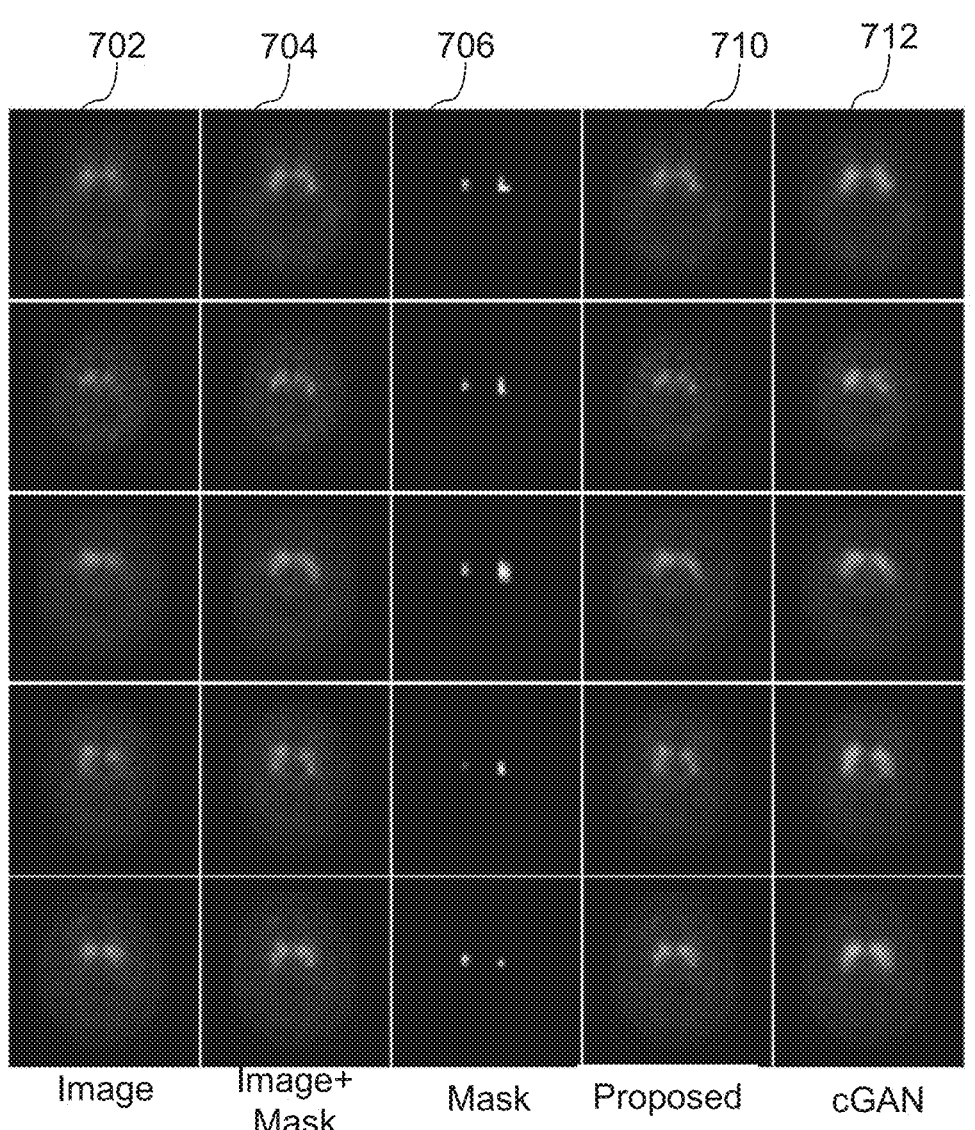
FIG. 7 shows results generated by the present framework.

FIG. 7 shows results generated by the present framework. Column 702 shows input DaTscan images x from the test data. Column 706 shows the explanation masks generated by the present framework. Column 704 overlays the input images x with the explanation masks to enable better visualization of the spatial patterns relative to the input images. The patterns of the calculated masks correlate extremely well with asymmetric or bilateral decrease of putamen uptake and are reasonable explanations why these scans were classified as abnormal. Column 712 shows the new input images x' of the trained cGAN that transform the abnormal input images 702 to normal images closely matching input images 702. Finally, column 710 shows the combined input x" that represents the sum of the current input image x and the new image x' blended by the Mask. These images x" closely match input images 702 and decrease the classifier's probability to below 50%.

Figure 8:
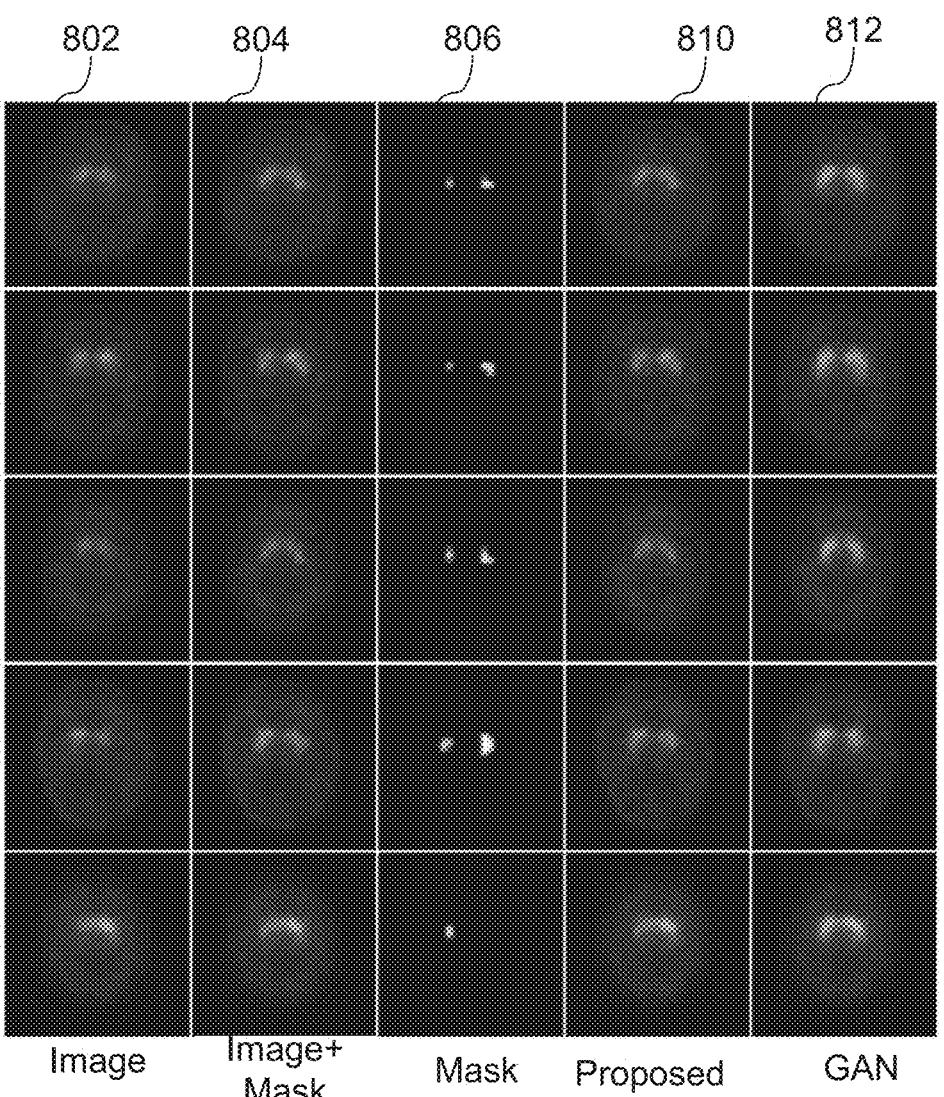
FIG. 8 shows additional results generated by the present framework.

FIG. 8 shows additional results generated by the present framework. Column 802 shows input DaTscan images x from the test data. Column 806 shows the explanation masks generated by the present framework. Column 804 overlays the input images x with the explanation masks to enable better visualization of the spatial patterns relative to the input images. The patterns of the calculated masks correlate extremely well with asymmetric or bilateral decrease of putamen uptake and are reasonable explanations why theses scans were classified as abnormal. Column 812 shows the new input images x' of the trained cGAN that transform the abnormal input images 802 to normal images closely matching input images 802. Finally, column 810 shows the combined input x" that represents the sum of the current input image x and the new image x' blended by the Mask. These images x" closely match input images 802 and decrease the classifier's probability to below 50%.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. One or more non-transitory computer readable media embodying a program of instructions executable by machine to perform operations for explanation mask generation, the operations comprising:

receiving an input image and a classifier;

generating, by a trained generative model, a new image that resembles the input image but is classified by the classifier as belonging to a different class from the input image;

generating at least one explanation mask by performing optimization based on the input image and the new image, wherein performing the optimization includes finding a smaller mask that decreases a classification probability of the classifier to a predetermined value; and presenting the explanation mask.

2. The one or more non-transitory computer readable media of claim 1 wherein the generative model comprises a conditional Generative Adversarial Network (cGAN).

3. The one or more non-transitory computer readable media of claim 1 wherein the operations further comprise training the generative model by penalizing the generative model in response to the generative model generating new images that are considered to belong to an incorrect class by the classifier.

4. A system comprising:

a non-transitory memory device for storing computer readable program code; and a processor in communication with the memory device, the processor being operative with the computer readable program code to perform operations including receiving training input images and a classifier;

training a generative model based on the training input images to generate new images that resemble the training input images but are classified by the classifier as belonging to one or more alternate classes;

generating at least one explanation mask by performing optimization based on a current input image and a new image generated by the trained generative model from the current input image, wherein performing the optimization includes finding a smaller mask that decreases a classification probability of the classifier to a predetermined value; and presenting the explanation mask.

5. The system of claim 4 wherein the classifier comprises a binary classifier that is trained to classify the training input images as normal or abnormal images.

6. The system of claim 4 wherein the processor is operative with the computer readable program code to train the deep generative model by training a Generative Adversarial Network (GAN).

7. The system of claim 4 wherein the processor is operative with the computer readable program code to train the deep generative model by training a conditional Generative Adversarial Network (cGAN).

8. The system of claim 4 wherein the processor is operative with the computer readable program code to train the generative model by penalizing the generative model in response to the generative model generating the new images that are considered to belong to an incorrect class by the classifier.

9. The system of claim 4 wherein the processor is operative with the computer readable program code to train the generative model by penalizing the generative model in response to the generative model generating the new images that are dissimilar to the training input images.

10. The system of claim 4 wherein the processor is operative with the computer readable program code to train the generative model by training the generative model to generate, in response to receiving a first input image classified by the classifier as "abnormal", a first new image to be "normal" and resembling the first input image.

11. The system of claim 4 wherein the processor is operative with the computer readable program code to train the generative model by training the generative model to generate, in response to receiving a second input image classified by the classifier as "normal", a second new image to be "abnormal" and resembling the second input image.

12. The system of claim 4 wherein each value in the explanation mask represents a blending factor between the current input image and the new image generated by the trained generative model from the current input image.

13. The system of claim 4 wherein the processor is operative with the computer readable program code to generate the at least one explanation mask by generating multiple different explanation masks from the current input image.

14. The system of claim 13 wherein the processor is operative with the computer readable program code to aggregate the multiple different explanation masks.

15. The system of claim 14 wherein the processor is operative with the computer readable program code to aggregate the multiple different explanation masks by performing a clustering technique.

16. The system of claim 4 wherein the predetermined value comprises 1/N, wherein N is a total number of classes determined by the classifier.

17. The system of claim 4 wherein the processor is operative with the computer readable program code to perform the optimization for a blended sum of the current input image and the new image generated by the trained generative model from the current input image.

18. A method comprising:

receiving training input images and a classifier;

training a generative model based on the training input images to generate new images that resemble the training input images but are classified by the classifier as belonging to one or more alternate classes;

generating at least one explanation mask by performing optimization based on a current input image and a new image generated by the trained generative model from the current input image, wherein the optimization decreases a classification probability of the classifier to a predetermined value comprising 1/N, wherein N is a total number of classes determined by the classifier; and presenting the explanation mask.

* * * * *